(12) United States Patent
Zimmerman et al.

(10) Patent No.: US 9,975,252 B2
(45) Date of Patent: May 22, 2018

(54) GRIPPER

(71) Applicant: Delaware Capital Formation, Inc., Wilmington, DE (US)

(72) Inventors: Anthony B. Zimmerman, Shelby Township, MI (US); Joshua Moses, Charlevoix, MI (US); Robert W. McArthur, Charlevoix, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days. days.

(21) Appl. No.: 14/854,117

(22) Filed: Sep. 15, 2015

(65) Prior Publication Data

US 2016/0082601 A1    Mar. 24, 2016

Related U.S. Application Data

(60) Provisional application No. 62/052,761, filed on Sep. 19, 2014.

(51) Int. Cl.
*B25J 15/02* (2006.01)
*B25J 15/00* (2006.01)
*B25B 5/08* (2006.01)

(52) U.S. Cl.
CPC .......... *B25J 15/0028* (2013.01); *B25B 5/087* (2013.01); *B25J 15/0226* (2013.01); *Y10S 901/37* (2013.01)

(58) Field of Classification Search
CPC .... B25J 15/0028; B25J 15/0226; B25J 19/02; B25B 5/087; Y10S 901/37
USPC ............................ 294/197, 202, 203; 269/32
See application file for complete search history.

(56) References Cited

U.S. PATENT DOCUMENTS

| 4,518,187 | A | * | 5/1985 | Blatt | B23Q 7/043 |
|---|---|---|---|---|---|
| | | | | | 294/119.1 |
| 4,607,873 | A | | 8/1986 | Nusbaumer et al. | |
| 4,852,928 | A | * | 8/1989 | Monforte | B25J 13/082 |
| | | | | | 294/119.1 |
| 5,284,375 | A | | 2/1994 | Land, III | |
| 5,503,378 | A | * | 4/1996 | Schauss | B23Q 7/043 |
| | | | | | 269/32 |
| 5,853,211 | A | | 12/1998 | Sawdon et al. | |
| 5,871,250 | A | | 2/1999 | Sawdon | |
| 5,938,259 | A | | 8/1999 | Sawdon et al. | |
| 5,941,513 | A | | 8/1999 | Moilanen et al. | |
| 6,048,013 | A | | 4/2000 | Moilanen et al. | |

(Continued)

FOREIGN PATENT DOCUMENTS

| DE | 202004017445 | 1/2005 |
|---|---|---|
| DE | 10324272 | 3/2005 |

(Continued)

*Primary Examiner* — Dean J Kramer
(74) *Attorney, Agent, or Firm* — Harness, Dickey & Pierce, P.L.C.

(57) ABSTRACT

A gripper has a body with a jaw support portion and powering portion. A powering assembly is positioned in the powering portion. A stationary jaw is secured to the jaw support portion. A movable jaw is pivotally secured to the jaw support portion about a pivot pin. A rod from the powering assembly connects in a slot on the movable jaw. The pivot pin is positioned on an opposite side of an axis of the rod on the clevis portion away from the stationary jaw. The non-clamping end of the movable jaw is incapable of extending below an end plane of the body of the stationary jaw side of the gripper.

14 Claims, 9 Drawing Sheets

(56) References Cited

U.S. PATENT DOCUMENTS

| | | | |
|---|---|---|---|
| 6,079,896 A * | 6/2000 | Dellach | B25B 5/087 269/32 |
| 6,176,533 B1 | 1/2001 | Moilanen et al. | |
| 6,227,586 B1 | 5/2001 | Moilanen et al. | |
| 6,273,408 B1 | 8/2001 | Moilanen et al. | |
| 6,425,616 B2 | 7/2002 | Moilanen et al. | |
| 6,530,615 B2 | 3/2003 | Filipiak et al. | |
| 6,557,916 B2 | 5/2003 | Moilanen et al. | |
| 6,575,512 B2 | 6/2003 | Moilanen et al. | |
| 6,588,816 B1 * | 7/2003 | Moilanen | B25B 5/087 269/279 |
| 6,641,189 B2 * | 11/2003 | Moilanen | B25B 5/087 294/116 |
| 7,032,944 B2 | 4/2006 | Moilanen et al. | |
| 7,172,230 B2 | 2/2007 | Maffeis | |
| 7,396,059 B2 | 7/2008 | Maffeis | |
| 7,845,698 B2 | 12/2010 | Jenkins et al. | |
| 7,976,087 B2 | 7/2011 | Maffeis | |
| 8,104,810 B2 | 1/2012 | Holcomb et al. | |
| 8,167,346 B2 | 5/2012 | Filipiak | |
| 8,454,069 B2 | 6/2013 | Jenkins et al. | |
| 2001/0006295 A1 | 7/2001 | Moilanen et al. | |
| 2002/0093211 A1 | 7/2002 | Filipiak et al. | |
| 2003/0038492 A1 | 2/2003 | Kruger | |
| 2005/0035516 A1 * | 2/2005 | Sawdon | B25B 5/087 269/32 |
| 2005/0104396 A1 * | 5/2005 | Maffeis | B23D 17/06 294/197 |
| 2008/0073922 A1 | 3/2008 | Holtz | |
| 2008/0237957 A1 | 10/2008 | Waldorf | |
| 2009/0108513 A1 | 4/2009 | Hara et al. | |

FOREIGN PATENT DOCUMENTS

| | | |
|---|---|---|
| DE | 10338061 | 3/2005 |
| DE | 102004025781 | 7/2005 |
| DE | 102004058994 | 6/2006 |
| DE | 102012003918 | 8/2013 |
| JP | 2002-151889 | 5/2002 |
| WO | WO2014-023286 | 2/2014 |

* cited by examiner

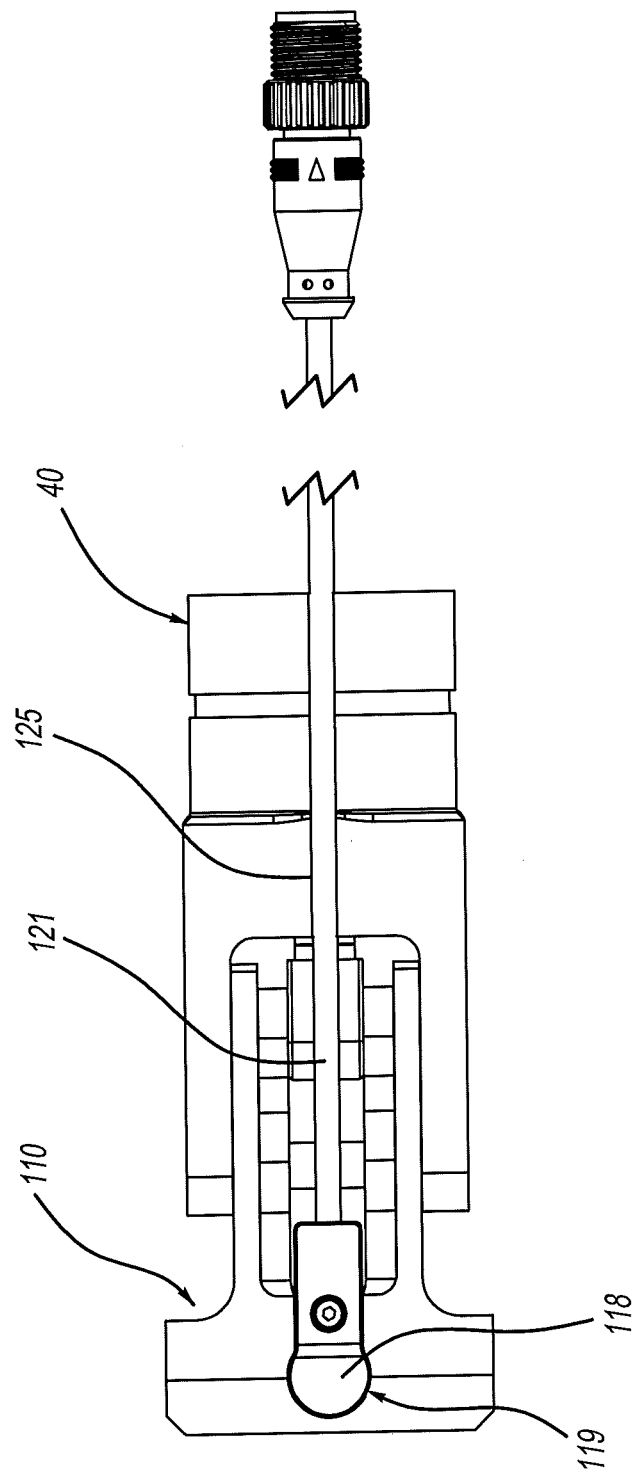

GRIPPER

CROSS-REFERENCE TO RELATED APPLICATIONS

This application claims the benefit of U.S. Provisional Application No. 62/052,761, filed on Sep. 19, 2014. The entire disclosure of the above application is incorporated herein by reference.

FIELD

The present disclosure relates to gripping sheet metal and, more particularly, to a lightweight simple designed gripper.

BACKGROUND

Current sheet metal grippers for press shop automation are relatively large and heavy. The limiting factor on the speed of a pressing operation is the speed of how fast the sheets can be transferred from one position to the next. The heavier the weight, on the end of the robot, the slower the robot moves due to an increase in applied moment. Accordingly, it is desirable to lessen the weight of the gripper while maintaining the gripping characteristics.

Accordingly, the present disclosure provides a gripper that eliminates weight while providing comparable gripping characteristics. The present disclosure provides a gripper that is formed from aluminum. The moving jaw provides a unique cam profile as well as a pivot point that prevents the non-gripping end of the movable jaw from protruding below the end plane of the gripper body. The footprint of the gripper is small compared to those currently in the market while providing comparable gripping force. The speed of the gripper is relatively high.

SUMMARY

Accordingly to the present disclosure, a gripper comprises a body having a clevis portion and cylindrical portion. A piston assembly is positioned in a bore of the cylindrical portion. A stationary jaw is secured to the clevis portion. A movable jaw is pivotally secured to the clevis portion about a pivot pin. A rod from the piston assembly is secured in a slot on the movable jaw. The pivot pin is positioned on the other side of the rod axis on the clevis portion away from the stationary jaw. The non-clamping end of the movable jaw is incapable of extending below an end plane of the body of the stationary jaw side of the gripper. A groove is formed on the outer circumference of the body cylindrical portion to retain tooling mounts. The stationary jaw includes an integral sensor to sense the presence of a part. The stationary jaw includes a knife edge for die entry. The movable jaw slot has an overall flattened V-shape configuration. A tool mount including a mounting key, to mate with the groove, retains the tool mount on the cylindrical portion. An axial bore is formed in a wall defining the body of the cylindrical portion. The axial bore enables fluid flow for piston activation. A plug seals the axial end of the bore at the exterior of the cylindrical portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is a bottom plan view of the gripper.

DETAILED DESCRIPTION

Figure 1:
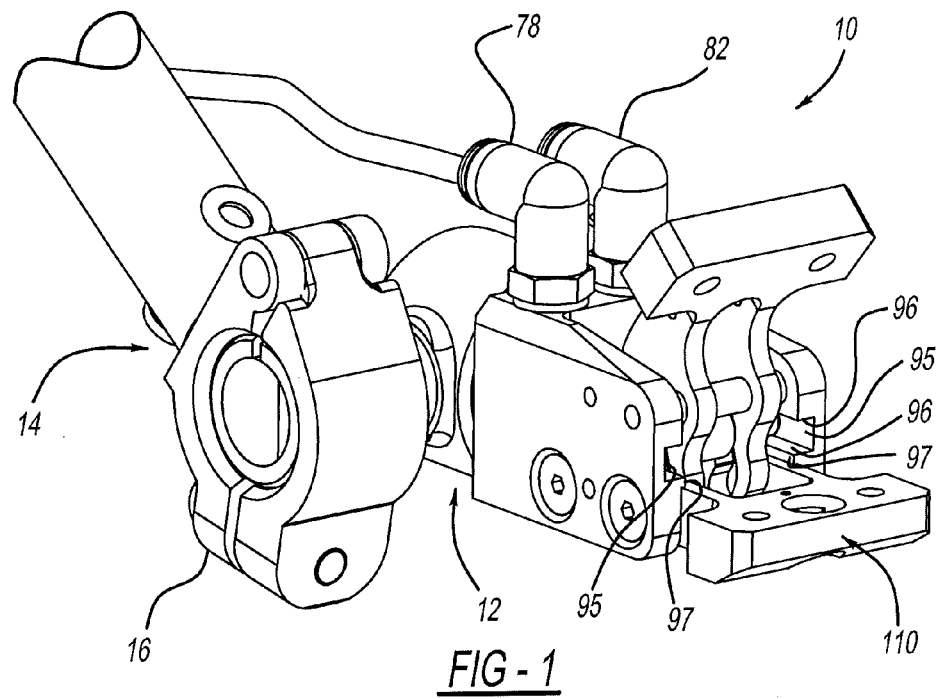
FIG. 1 is a perspective view of a gripper secured on an end of a robot.
Figure 7:
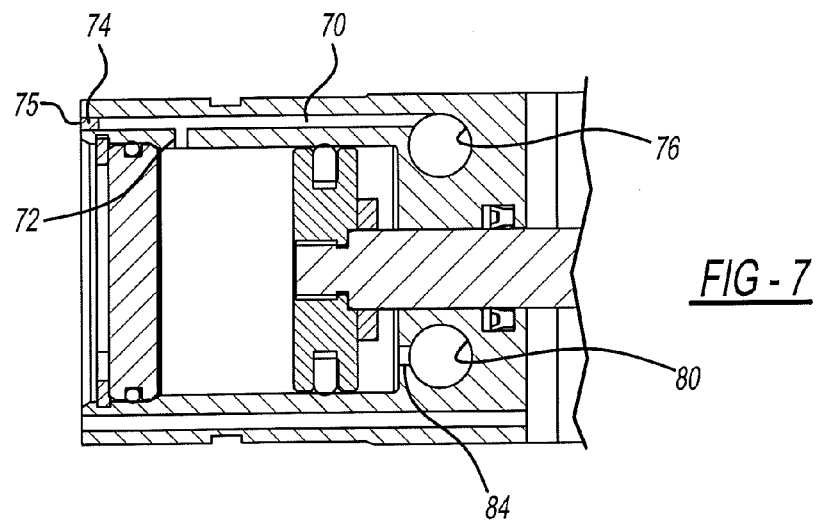
FIG. 7 is a cross section view of FIG. 5 along line 7-7.
Figure 2:
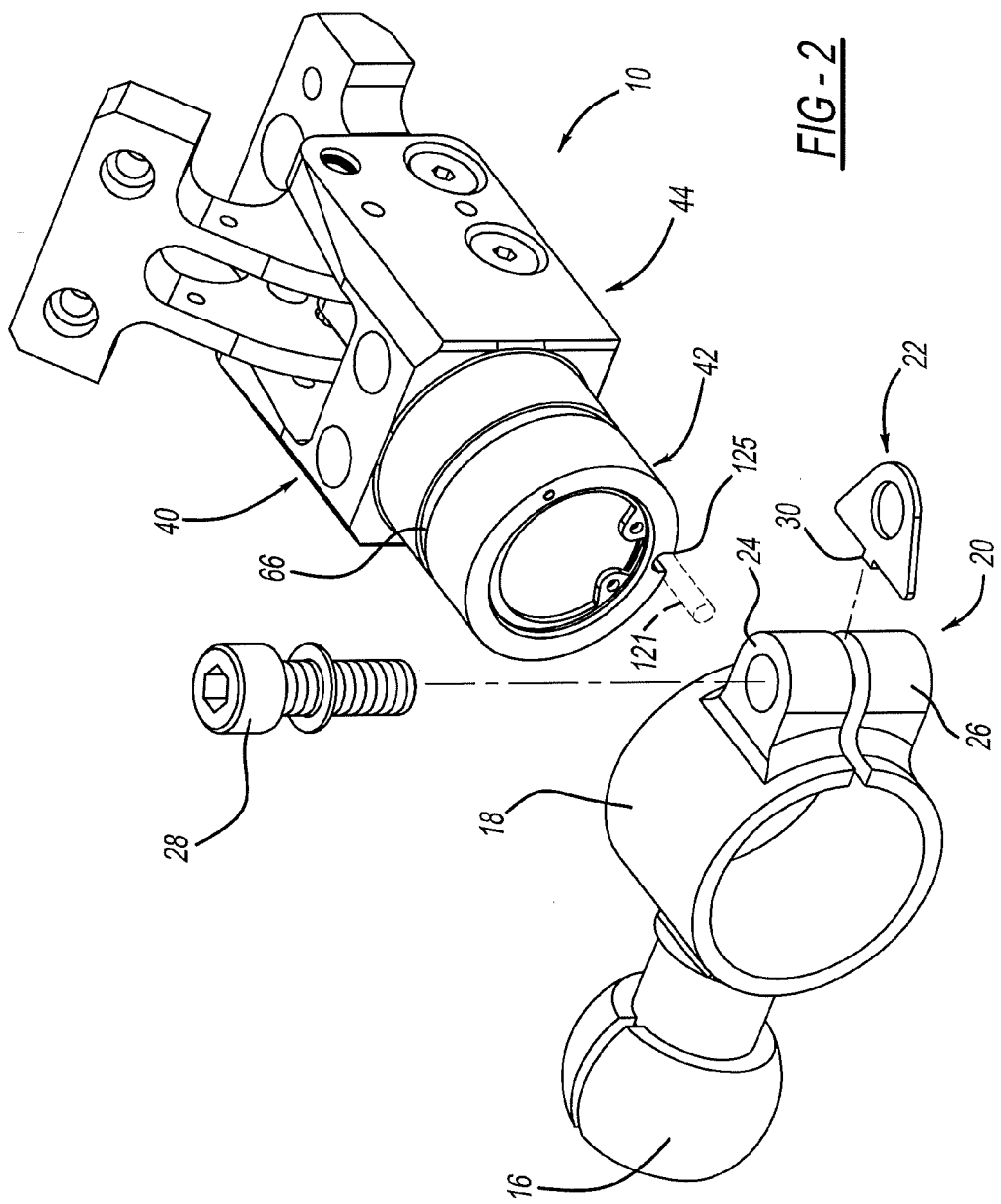
FIG. 2 is an exploded perspective view of the gripper and tooling mount.
Figure 3:
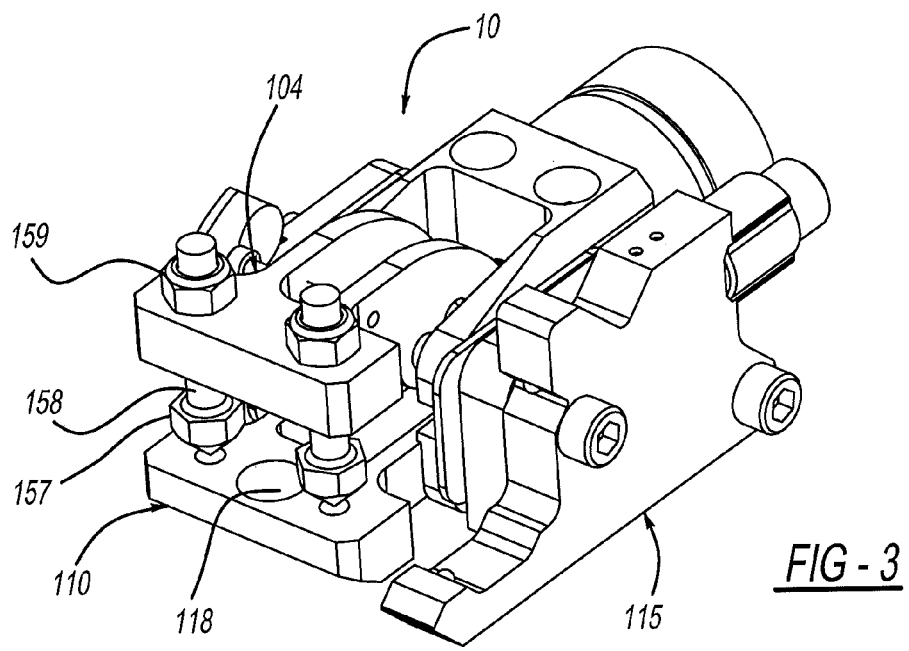
FIG. 3 is a front perspective view of the gripper in a gripping position.
Figure 8:
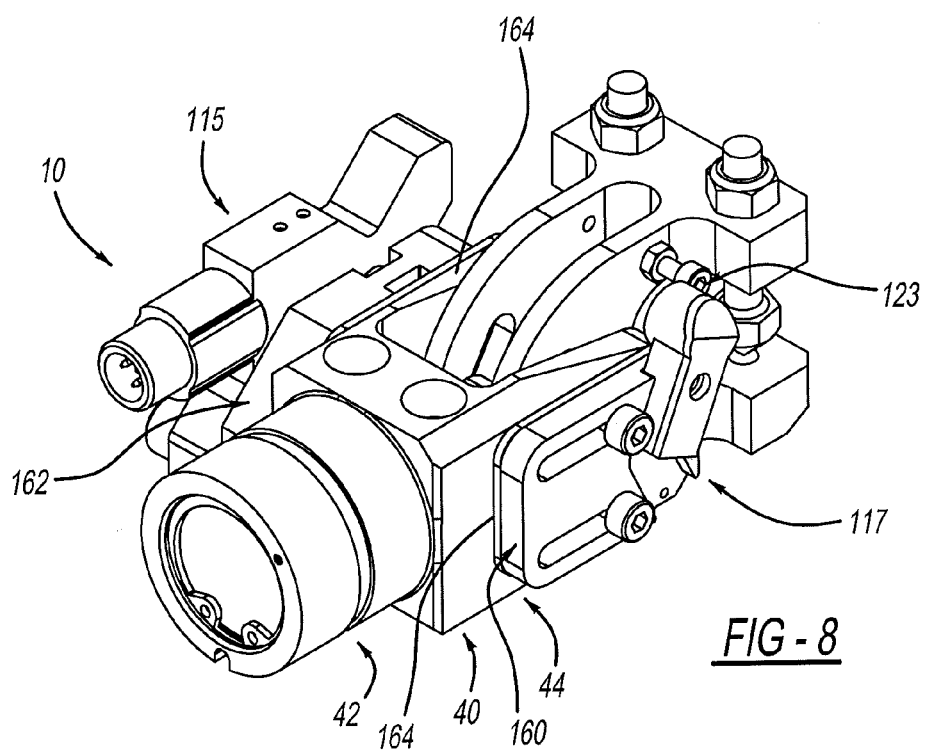
FIG. 8 is a rear perspective of the gripper.
Figure 4:
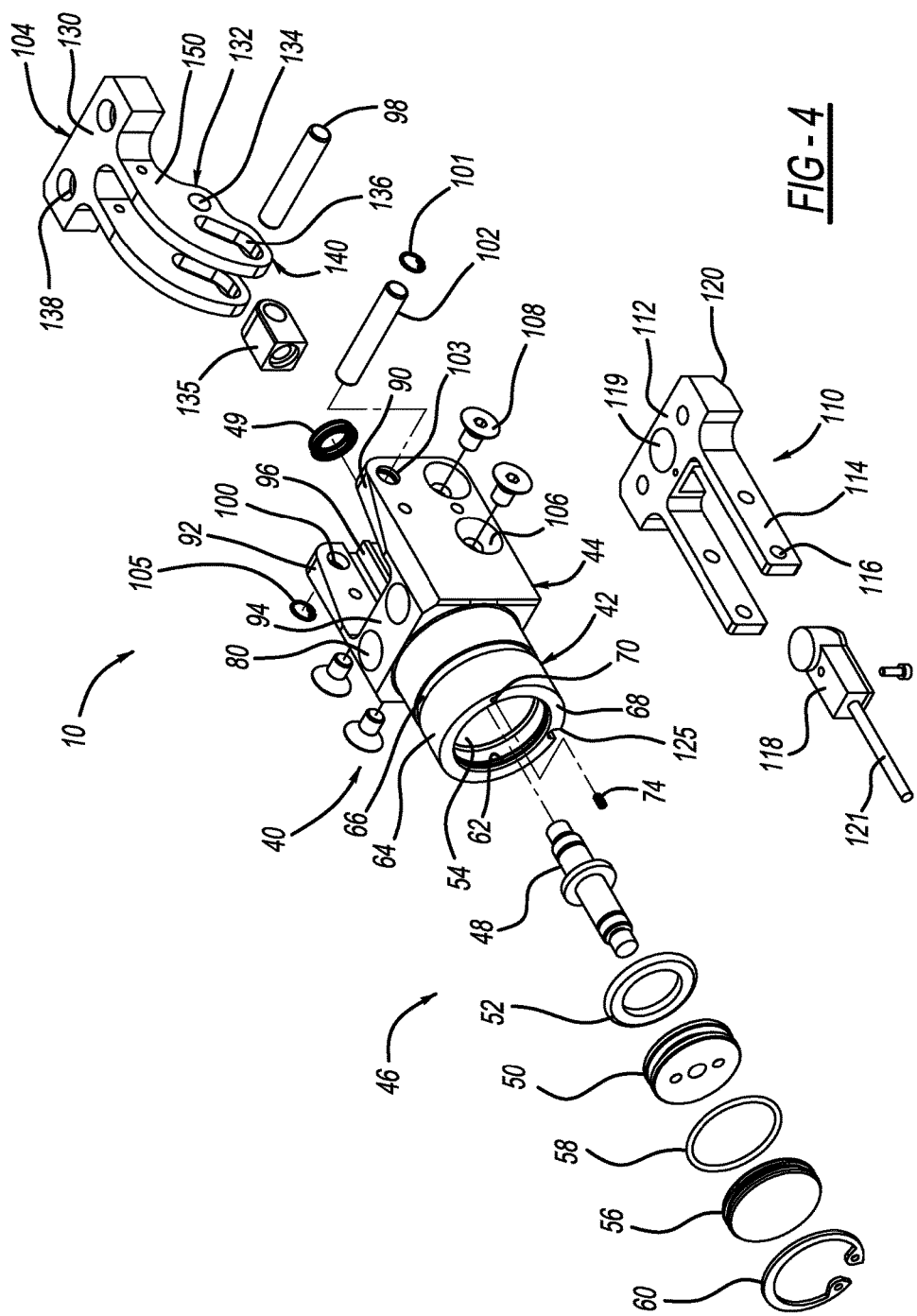
FIG. 4 is an exploded perspective view of the gripper.
Figure 5:
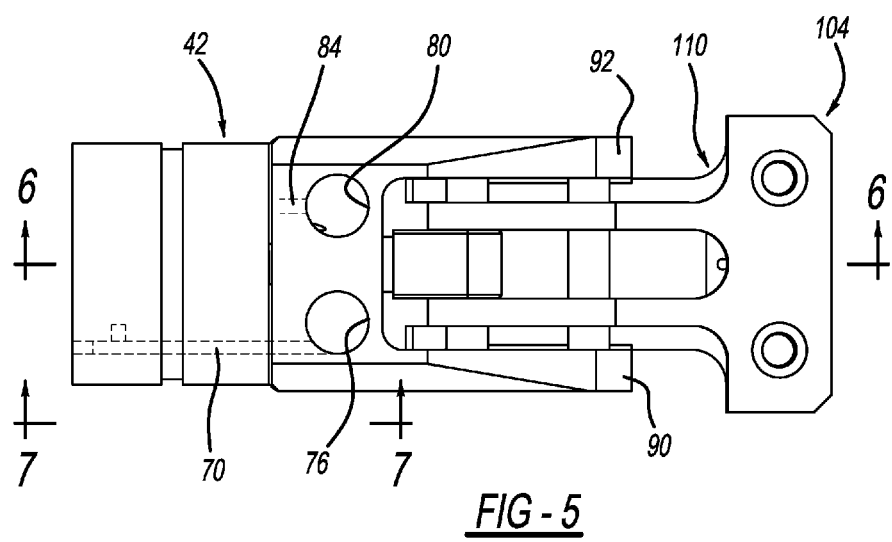
FIG. 5 is a top plan view of FIG. 4.
Figure 6:
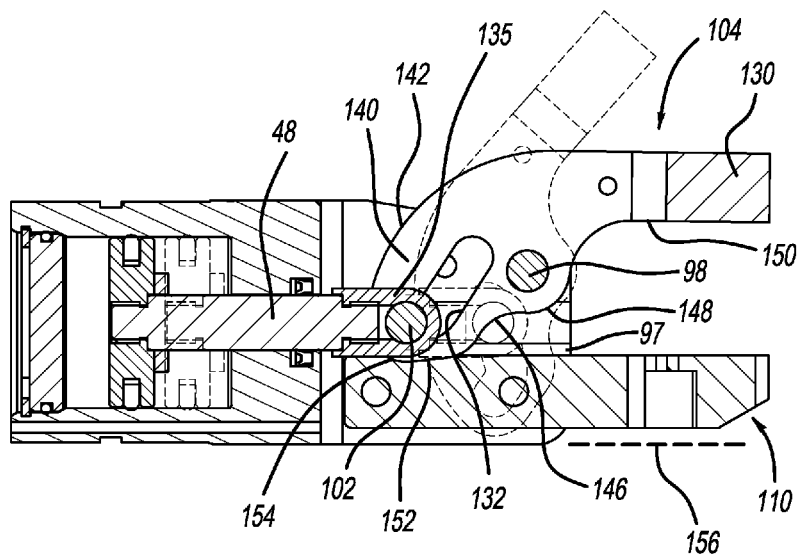
FIG. 6 is a cross section view of FIG. 5 along line 6-6 thereof.
Figure 10:
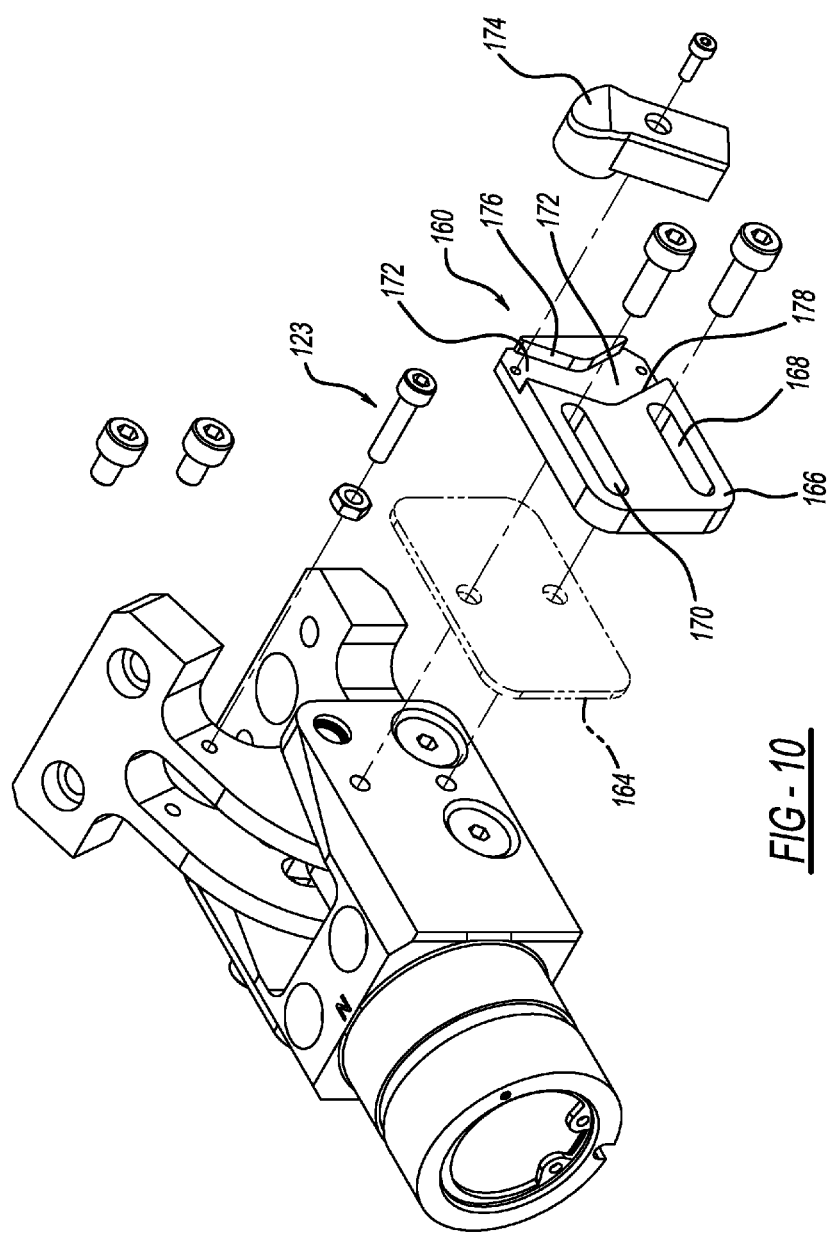
FIG. 10 is an exploded perspective view of a first bracket assembly.

Example embodiments will now be described more fully with reference to the accompanying drawings.

Turning to the figures, a gripper is illustrated and designated with the reference numeral 10. A tooling mount 12 is illustrated to secure the gripper 10. The tooling mount 12 secures onto the end of a robot 14.

The tool mount 12 includes a ball 16 to attach with the robot 14. Also, the tooling mount 12 includes a collar 18 and a threaded block 20. The ball 16 is secured with the collar 18. A mounting key 22 is passed between the blocks 24, 26 and is secured by a fastener 28. The mounting key 22 has an extended portion 30. The extended portion 30 projects into a groove 66 in the gripper 10, as will be explained later.

The gripper 10 includes a body 40. The body 40 is generally of a one piece aluminum or other lightweight metal construction. The body 40 includes a powering portion 42, here illustrated as a cylindrical portion, and a jaw support portion 44, here illustrated as a clevis portion. The cylindrical portion 42 acts as a housing for a powering assembly 46, here illustrated as a piston assembly. The piston assembly includes a piston rod 48, a rod seal 49 and a piston 50 with an outer seal 52. The cylindrical portion 42 includes a cylindrical bore 54 to receive the piston assembly. The end of the cylinder bore 54 is closed by a bore plug 56 with an O-ring seal 58. A retaining spring clip 60 secures the bore plug 56 and seal 58 in the cylindrical bore 54, via contact of the clip 60 with an inner circumferential groove 62.

The outer circumferential surface 64, of the cylindrical portion 42, includes a circumferential groove 66. The circumferential groove 66 receives the extending portion 30 of the mounting key 22. The extending portion 30 positions and maintains the tooling mount 12 with the cylindrical portion 42 of the body 40.

The cylinder wall 68 of the cylindrical portion 42 includes an axial bore 70. The axial bore 70 includes an outlet 72. The outlet 72 enables fluid to enter into the cylindrical bore 54. The axial bore 70 is drilled through the cylinder wall 68 of the cylindrical portion 42. The axial bore 70 is closed off by a plug 74. The plug 74 is inserted into the exterior end surface 75 of the cylinder wall 68. The interior end of the bore 70 couples with bore 76. The bore 76 receives a fluid conduit 78. A second bore 80 receives a fluid conduit 82. The second bore 80 is also formed in a web 94 of the clevis portion 44. The bore 80 is coupled with a fluid outlet 84. The fluid outlet 84 enables fluid to enter into the cylindrical bore 54.

The jaw support or clevis portion 44 is U-shaped having a pair of arms 90, 92 connected, via the web portion 94. The web portion 94 includes the bores 76, 80, generally threaded, that receive the fluid conduits 78, 82. The inner surface of the arms 90, 92 may include a guiding groove 95 defined by guiding surfaces 96. The guiding surfaces 96 oppose one another and the guiding grooves 95 may receive a driving journal pin 98. Also, a shelf 97 is positioned adjacent the guiding groove 95. The shelf 97 locates the stationary bottom jaw 110 on the clevis portion 44. The journal pin 98 moves in the grooves without bushings or bearings. This provides the gripper with a small size and helps to prevent the movable jaw 104 from breaking the bottom plane of the body. The arms 90, 92 include apertures 100 that receive a pivot pin 102 for the movable jaw 104. The pivot pin 102 is retained in the apertures 100 by a C-clip 101. The C-clip 101 fits into a groove 103 on one of the arms 90 of the clevis portion 44. The arm 92 includes a pilot bore 105 that is smaller than bore 100. The pilot bore 105 enables a punch or the like to be received in the pilot bore 105 and contact the pivot pin 102 to remove the pivot pin 102 from the arms 90, 92 of the clevis portion 44. The arms 90, 92 include bores 106 that enable passage of fasteners 108 into the gap between the arms 90, 92. The fasteners 108 secure the bottom jaw 110, abutting the shelves 94, with the clevis portion 44. An optical sensor 115 may be secured to the arm 92. Also, a double blank detection sensor 117 may be mounted to arm 90. Along with stop 123, the double blank detection sensor is adjustable for different part thicknesses.

The bottom jaw 110 includes a web 112 with a pair of extending arms 114. The arms 114 include apertures 116 to receive the fasteners 108. The web 112 includes a bore 119 to receive a sensor 118. The sensor 118 senses the presence of a part between the jaws 104, 110. The base 112 includes a bottom jaw knife edge 120. The knife edge 120 enables entry into a die.

When the sensor 118 is positioned in the bore 119, it is secured by a fastener onto the web 112. A wire 121 extends from the sensor 118. The wire 121 passes through the opening between the arms 114 of the bottom jaw 110. The wire 121 continues into a groove 125 in the body 40. The groove 125 surrounds the wire to protect and prevent movement of the wire 121 on the body 40. Additionally, the tool mount collar 18 surrounds the wire locking it in place on the body.

The movable jaw 104 includes a body 130 with a pair of extending arms 132. The movable jaw 104 is manufactured from aluminum, preferably 7075+6 aluminum. The arms 132 include apertures 134 to receive the pivot pin 102. Additionally, the arms include a slot 136 to receive the drive journal pin 98. The drive journal pin 98 is retained in a pin clevis 135 secured to the piston rod 48. The slots 136 have an overall flattened V-shape to enable movement of the jaw 104 from a clamping to a non-clamping position. The body 130 includes apertures 138 that receive clamping members 158. The clamping members 158 clamp the part between the jaws 104, 110. The clamping members 158 are adjusted and locked in place by hex heads 157, 159 of the tips and nuts of the clamping member 158.

The end portion 140 of the arms 132, in side elevation view, has an overall turtle shell shape. The first side 142 is arcuate and extends from the first portion 150 of the arms 132. The other side 144 has a planar section 152, an arcuate cutout section 146 and a projecting curved section 148 returning to the first portion 150. The arcuate cutout portion 146 is curved and aligned with an end of the flattened V shape slot 136. The pivot aperture 134 is positioned on the side of the piston rod axis away from the stationary jaw 110. The movable jaw 104 moves from a clamped to an unclamped position. During movement, the curved end 154 of the arm 132 does not break the plane of an end plane 156 of the body of the gripper. This enables a much smaller cutout in the die for the gripper entry to pick up the sheet metal parts.

In operation, depending upon the state of the piston assembly, fluid enters through port 76 along bore 72 and exits into cylinder 54. The piston assembly moves forward to move the movable jaw 104 into a non-clamping or retracted position. The movable jaw 104 is moved into a clamped position by fluid entering through port 80 through outlet 84 into cylinder 54. This, in turn, moves the piston assembly in a second direction moving jaw 104 into a clamped position. The fluid is controlled by a controller (not shown) to move the jaws 104, 110 between a clamped and non-clamped position.

The gripper assembly includes bi-directional mounting sensing brackets 160, 162 as well as a reversible sheet stop 164. The bracket 160 includes a body 166, slots 168, 170 that enable lateral adjustment of the bracket 160. Also, the bracket 160 includes a sensor receiving channel 172 that receives sensor 174. The channel 172 has a first side 176 and a second side 178. The channel sides 176, 178 are the same, except they are mirror images of one another. Thus, when the bracket 160 is flipped from one side of the body 40 to the other, the channel sides 176, 178 enable the sensor 174 to be positioned in a proper orientation. Thus, the user can utilize the right hand side or the left hand side of the gripper 10 without the need for special sided brackets.

Bracket 162 has a body 180 with an overall rectangular configuration. The body 180 includes a pair of channels 182, 184. A slot 186, acting as an aperture, is formed through the narrowed body portion 188. The channels 182, 184 act as countersinks to receive fasteners 190. The fasteners 190 pass through the slot 186. The slot 186 enables vertical adjustment of the bracket 162. The bracket 162 may be positioned on the left or right side of the gripper to eliminate the need for designated side bracket sets.

The sheet stop 164 is a symmetrical. The stop 164 has a rectangular configuration to enable the sheet stop to be flipped from one side to the other. This occurs after wear on one side of the sheet stop. Thus, the same sheet stop provides the user with twice the use life.

Figure 11:
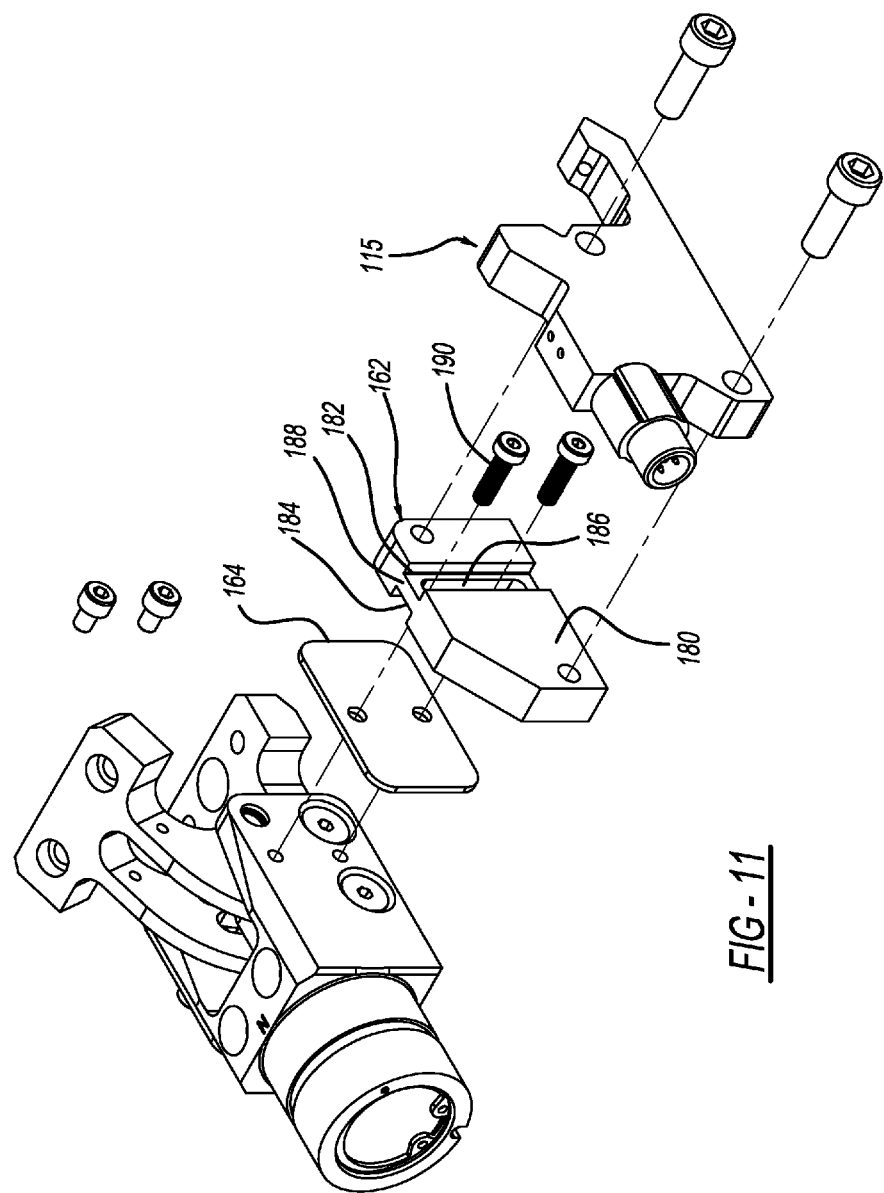
FIG. 11 is an exploded perspective view of a second bracket assembly.
Figure 12:
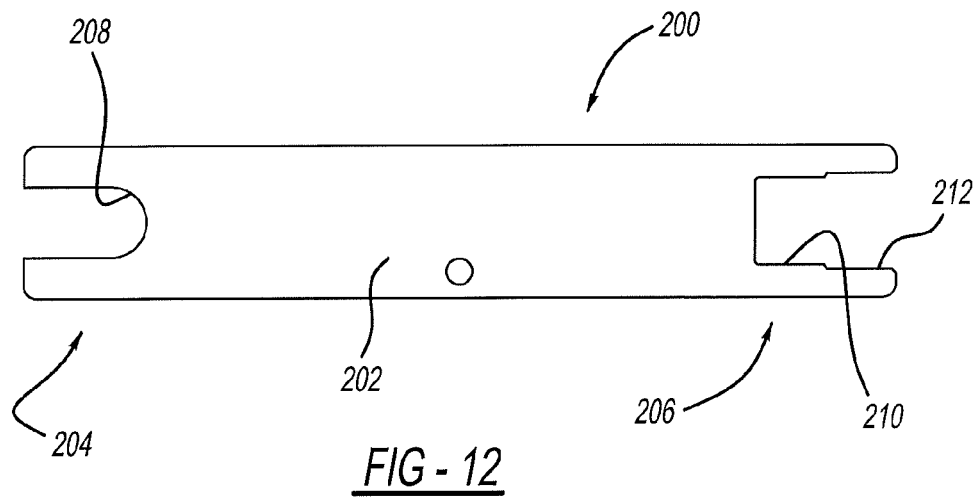
FIG. 12 is a top plan view of an adjustment tool.
Figure 13:
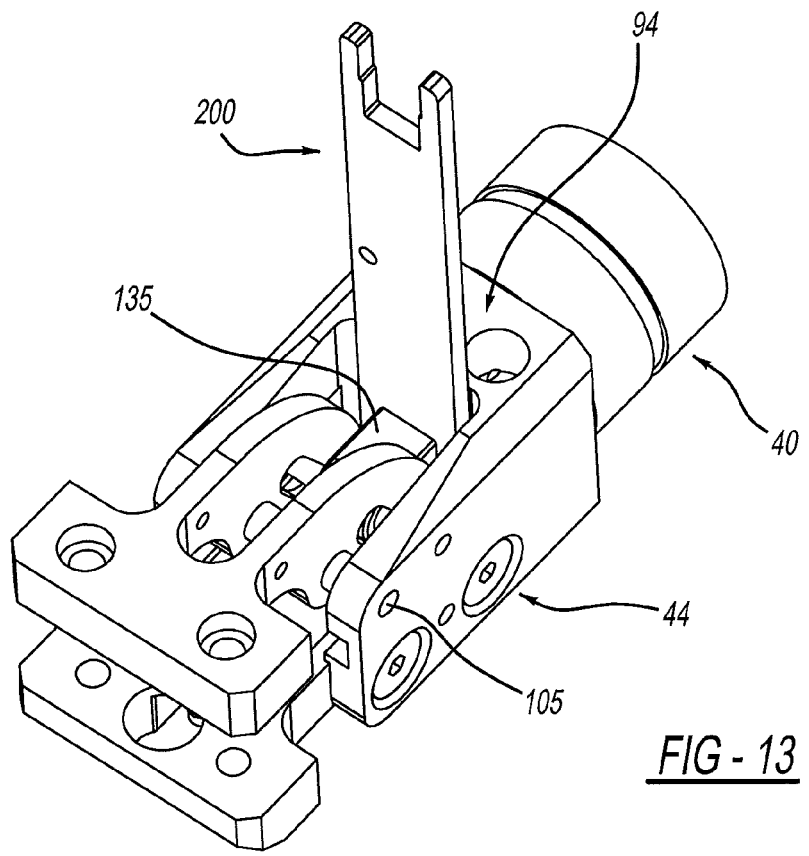
FIG. 13 is a perspective view of a gripper with the adjustment tool positioned on the gripper.

Turnings to FIGS. 11 and 12, tip adjustment tool 200 is illustrated. The tip adjustment tool 200 has an overall planar body 202. The body 202 has a desired thickness to enable a course adjustment of the gripper 100. The body 202 includes ends 204, 206. The first end 204 includes a U-shaped cut-out 208 that is positioned around the piston rod 48 when the gripper 100 is in a use position as illustrated in FIG. 12. Additionally, the second end 206 includes a plurality of channels 210, 212. The channels 210, 212 are co-linearly positioned adjacent to one another. The channels 210, 212 have a desired width to contact and rotate the hex nut heads 157, 159 of the clamping members 158 so that the tool 200 can readily adjust the clamping member tips 158 to provide a fine adjustment of the gripper 100.

In operation, the clamping members 158 are adjusted or loosened on the movable jaw 104. The movable jaw 104 is opened with the tool 200 positioned between the pin clevis 135 and the web 94 of the clevis portion 44. The U-shaped cutout 208 is positioned on the piston rod 48. The gripper 100 is actuated so that the pin clevis 135 locks the tool 200 between the web 94 of the clevis portion 44 and the clevis pin 135. After that, a workpiece is positioned between the jaws 104, 110. The clamping member tips 157 are then tightened onto the workpiece. The tool 200, utilizing the second end channels 210, 212 is utilized as a wrench to apply a torque to lock the members 160 in position on the workpiece. Thus, the top nut as well as the bottom is utilized to secure the workpiece between the clamping jaws 104, 110.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gripper comprising:
a body having a support portion and powering portion;
a powering assembly in the body powering portion;
a stationary jaw on the support portion, the stationary jaw has a pair of legs for coupling the stationary jaw to the support portion;
a movable jaw pivotally secured to the support portion about a pivot pin, a rod of the powering assembly connected via a journal pin in a slot on the movable jaw, the pivot pin positioned on the support portion away from the stationary jaw, the pivot pin on an opposite side of an axis of the rod with respect to the stationary jaw, the journal pin extending from the movable jaw, the journal pin directly engaging a guide in the support portion such that the journal pin, in contact with the guide, moves directly on the guide without bearings, bushings or mechanical supports, and a non-clamping end of the movable jaw moves in-between the legs of the stationary jaw and is incapable of extending below an end plane of the body on the stationary jaw side of the gripper.

2. The gripper of claim 1, further comprising a retaining member on an outer circumference of the powering portion for retaining tooling mounts.

3. The gripper of claim 1, wherein the stationary jaw includes a sensor for sensing presence of a part.

4. The gripper of claim 1, wherein the stationary jaw includes a knife edge for die entry.

5. The gripper of claim 1, wherein the movable jaw slot has an overall flattened V-shape.

6. The gripper of claim 1, wherein an axial bore is formed in a cylinder wall, defining the powering portion, for enabling fluid flow for piston activation.

7. The gripper of claim 6, wherein a plug seals the axial bore at an exterior end of the powering portion.

8. The gripper according to claim 1, further comprising a bi-directional mounting sensor bracket, wherein the bi-directional mounting sensor bracket is movable from one side of the support portion to the other.

9. The gripper according to claim 1, further comprising a symmetrical sheet stop being reversible for increasing wear life of the symmetrical sheet stop.

10. The gripper according to claim 1, further comprising a shelf on the support portion for positioning the stationary jaw.

11. The gripper according to claim 1, further comprising a pilot bore in the support portion aligned with the pivot pin for enabling easy removal of the pivot pin.

12. The gripper according to claim 1, further comprising a slot in the gripper body for receiving a wire, the slot being covered by a mount.

13. A robot and gripper comprising:
a robot having an end to receive a gripper;
a gripper having a mechanism connecting with the robot end, the gripper further comprising:
a body having a jaw support portion and powering portion;
a powering assembly in the body powering portion;
a stationary jaw with a pair of legs for coupling the stationary jaw with the jaw support portion;
a movable jaw pivotally secured to the jaw support portion about a pivot pin, a rod of the powering assembly connected via a journal pin in a slot on the movable jaw, the pivot pin positioned on the jaw support portion away from the stationary jaw, the pivot pin on an opposite side of an axis of the rod with respect to the stationary jaw, the journal pin extending from the movable jaw, the journal pin directly engaging a guide in the support portion such that the journal pin, in contact with the guide, moves directly on the guide without bearings, bushings or mechanical supports, and a non-clamping end of the movable jaw moves in-between the legs of the stationary jaw and is incapable of extending below an end plane of the body on the stationary jaw side of the gripper.

14. A gripper comprising:
a body having a support portion and powering portion;
a powering assembly in the body powering portion;
a stationary jaw on the support portion;
a movable jaw pivotally secured to the support portion about a pivot pin, a rod of the powering assembly connected via a journal pin in a slot on the movable jaw, the pivot pin positioned on the support portion away from the stationary jaw, the pivot pin on an opposite side of an axis of the rod with respect to the stationary jaw, the journal pin extending from the movable jaw and engaging a guide in the support portion such that the journal pin moves directly on the guide without bearings, bushing or mechanical supports, and a non-clamping end of the movable jaw is incapable of extending below an end plane of the body on the stationary jaw side of the gripper;
a retaining member on an outer circumference of the powering portion for retaining tooling mounts; and
a tool mount including a mounting key for mating with the outer circumference to retain the tool mount on the powering portion.

* * * * *

UNITED STATES PATENT AND TRADEMARK OFFICE
CERTIFICATE OF CORRECTION

Page 1 of 1

PATENT NO.        : 9,975,252 B2
APPLICATION NO.   : 14/854117
DATED             : May 22, 2018
INVENTOR(S)       : Anthony B. Zimmerman et al.

It is certified that error appears in the above-identified patent and that said Letters Patent is hereby corrected as shown below:

On the Title Page (*) Notice, Column 1 "days. days." should be --days.--

Signed and Sealed this
Second Day of October, 2018

Andrei Iancu
*Director of the United States Patent and Trademark Office*